US005297902A

United States Patent [19]

Jambor et al.

[11] Patent Number: 5,297,902

[45] Date of Patent: Mar. 29, 1994

[54] CUTTER INSERTS FOR SIGN ENGRAVING MACHINE

[75] Inventors: George F. Jambor, Cedarburg; Keith W. Schroeder, Milwaukee, both of Wis.

[73] Assignee: Brady USA, Inc., Milwaukee, Wis.

[21] Appl. No.: 25,013

[22] Filed: Mar. 2, 1993

[51] Int. Cl.$^5$ ............................ B23C 5/02; B23C 5/24

[52] U.S. Cl. ............................ 407/42; 407/30

[58] Field of Search ............................ 407/30, 34, 42, 54, 407/113, 114, 119, 120

[56] References Cited

U.S. PATENT DOCUMENTS

| | | | |
|---|---|---|---|
| 2,378,830 | 6/1945 | Chaddock | 145/127 |
| 2,855,811 | 10/1958 | Fried | 407/30 |
| 3,344,690 | 10/1967 | Proska | 407/113 |
| 3,814,536 | 6/1974 | Garrett | 408/157 |
| 4,244,669 | 1/1981 | Puritz et al. | 407/30 |
| 4,525,110 | 6/1985 | Stovanovski | 407/113 |
| 4,575,888 | 3/1986 | Muren | 407/114 |
| 4,595,320 | 6/1986 | Berner et al. | 408/182 |
| 4,645,383 | 2/1987 | Lindsay | 407/34 |
| 4,934,881 | 6/1990 | Tsujimura et al. | 407/42 |
| 4,993,892 | 2/1991 | Takahashi | 407/114 |
| 5,004,380 | 4/1991 | Hessman et al. | 402/114 |

FOREIGN PATENT DOCUMENTS 1484478 6/1989 U.S.S.R. .

*Primary Examiner*—William E. Terrell

*Attorney, Agent, or Firm*—Quarles & Brady

[57] ABSTRACT

A pair of replaceable, identical cutter inserts are provided for a cutter head assembly of a sign engraving machine. The cutter inserts have inside edges formed at an angle of approximately 15° from a cutter tip axis. The inside edges of the cutter insert overlap to form an "X" when installed in the cutter head for sign engraving operations. Chips migrate up the inside edges from the cutter tips and are exhausted from the cutting area.

4 Claims, 3 Drawing Sheets

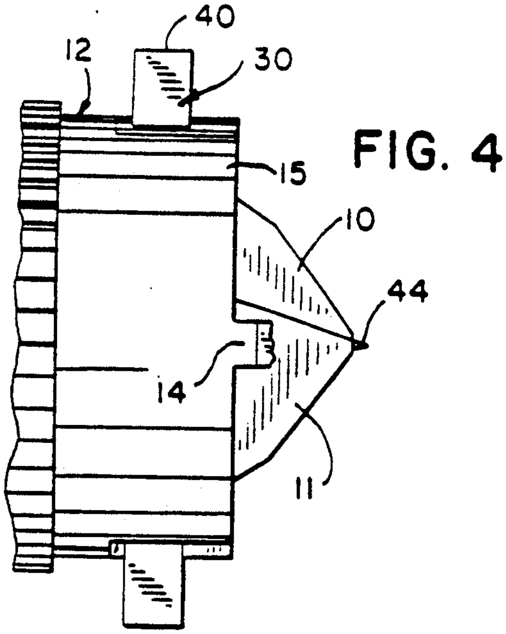
FIG. 4
FIG. 5
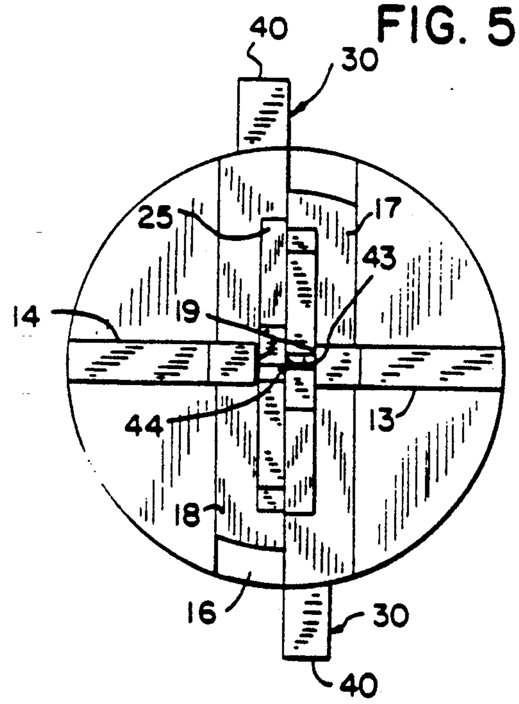
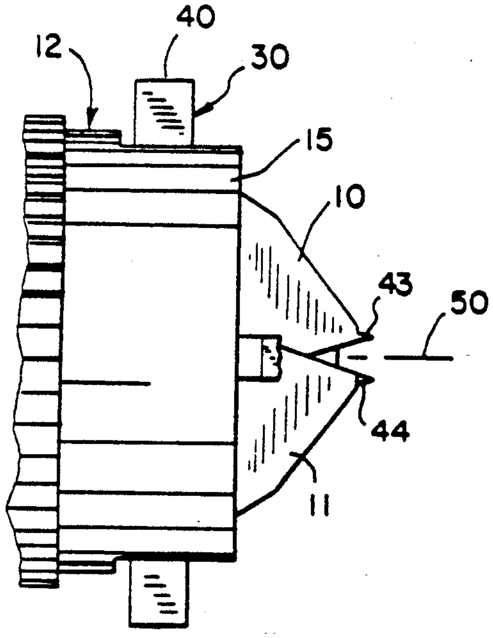
FIG. 6
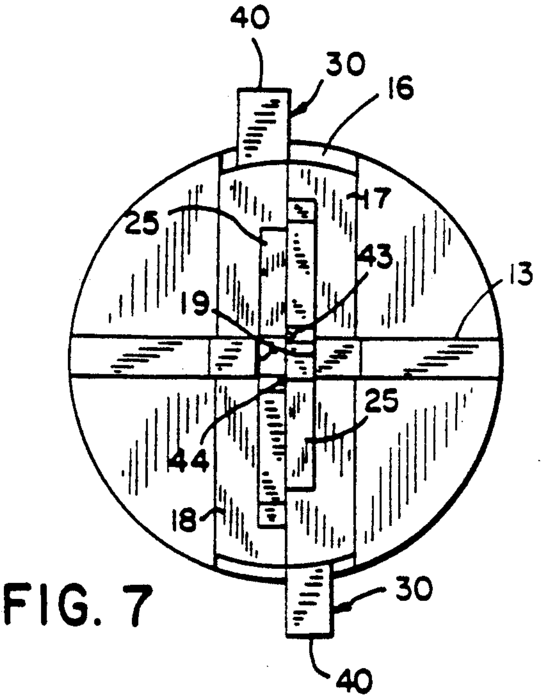
FIG. 7

FIG.8
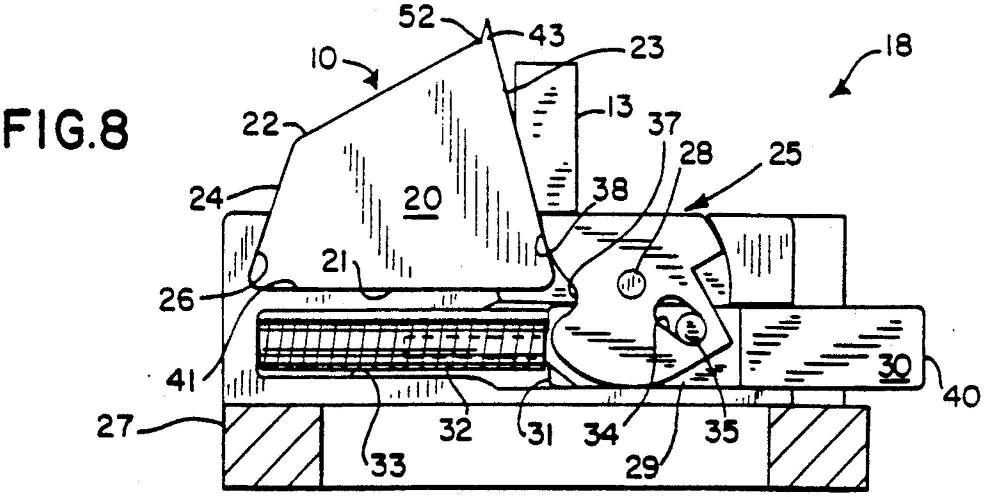
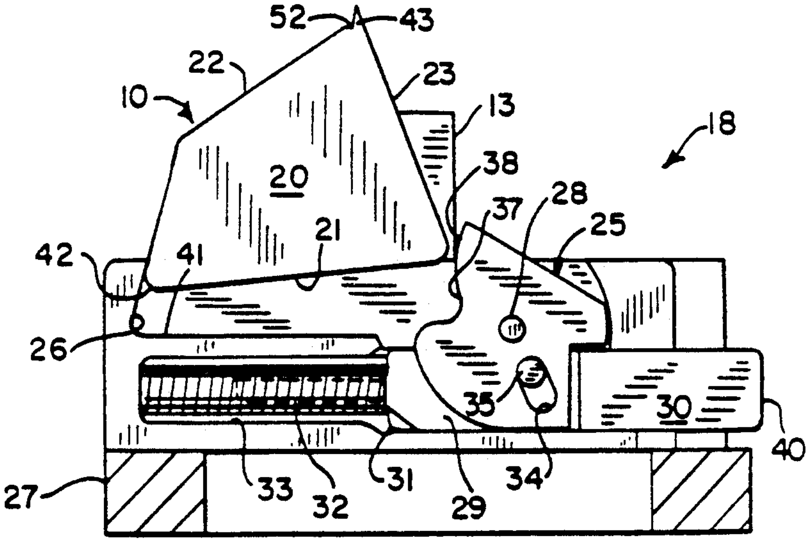
FIG.9
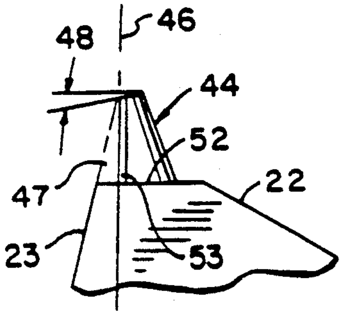
FIG. 11
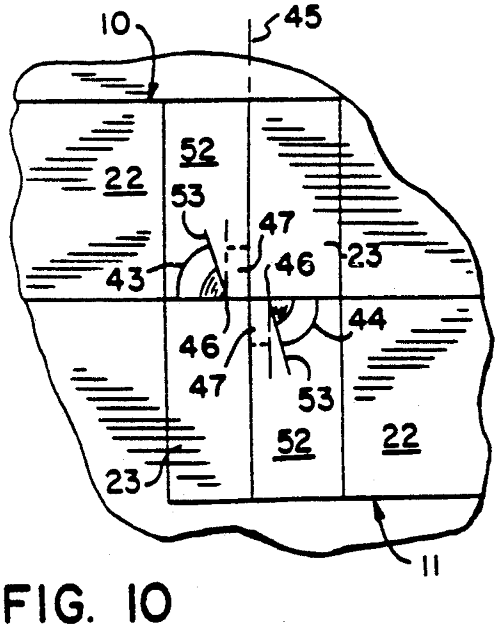
FIG. 10

CUTTER INSERTS FOR SIGN ENGRAVING MACHINE

BACKGROUND OF THE INVENTION

1. Field of the Invention The field of the invention is replaceable cutting bits for cutting metal and plastic, and more particularly cutting bits for a sign engraving machine.

2. Description of the Background Art

It is typical in machines for cutting metal and plastic to have some type of replaceable cutter blade. There are, however, many designs for such blades and their holders, and substantial commercial advantages can inure to those products which exemplify superior designs.

Soviet Patent Abstract SU 1484-478-A shows a milling cutter with two cutting knives pivoted around a common pivot to adjust the distance between their cutting tips, which are formed as corners of the cutting knives. This changes the angle of the blades relative to the cutting surface without teaching any particular advantageous angular relationships.

Other milling and boring cutters disclosed in U.S. Pat. Nos. 3,814,536; 4,595,320 and 4,645,383 have used replaceable inserts in which an entire edge or side of the cutter body provides the cutting edge. These cutters have utilized means such as Allen-head screws for fixing the cutter inserts in the cutter head. This, in turn, requires the use of tools when replacing worn out cutter inserts with a new set.

The present invention was made in response to a need to provide blades, which were easily replaceable without the use of special tools, which exhibit reasonable operating life, and which are especially suited for cutting metal or plastic in sign engraving operations.

SUMMARY OF THE INVENTION

The invention provides a cutter insert, a pair of which are used in a rotatable chuck head to engrave a line of a width defined by the spacing of the tips of the two cutter inserts.

Each cutter insert has a body and a cutter tip projecting from the bottom edge. The cutter tip is formed as approximately one-quarter of a cone around a longitudinal axis of the cutter tip. The body has a side edge running at an angle of about fifteen degrees relative to the longitudinal axis of the cutter tip. The cutter tip is also formed with a cutout portion from the 15-degree side edge of the body.

When the cutter tips are positioned in the chuck head, the 15-degree inside edges cross each other in an "X" pattern. This provides a path for chips from engraving operations to migrate from the cutter tips up the bodies of the inserts, where they are spun around and flung into a circular exhaust system. It has been discovered that this 15-degree angle prevents chips from becoming wedged and stuck between the cutter inserts. The cutout or relief of the cutter tips along the 15-degree side edge also helps prevent chips from becoming wedged or stuck between the cutter inserts.

The invention is more particularly embodied in an insert made of a sintered carbide material. The body of the insert has a quadrilateral shape with four non-parallel edges. The shape must be controlled during manufacture, because once the material has gone through the sintering process, it is very hard and difficult to machine to other shapes.

Other objects and advantages, besides those discussed above, shall be apparent to those of ordinary skill in the art from the description of the preferred embodiment which follows. In the description, reference is made to the accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 4 is a a left side view of the cutter head of FIG. 1, with the cutter inserts adjusted to the closed position;

FIG. 5 is a front end view of the cutter head of FIG. 1, with the cutter inserts adjusted to the closed position;

FIG. 6 is a a left side view of the cutter head of FIG. 1, with the cutter inserts adjusted to a position between the wide-open position and the closed position;

FIG. 7 is a front end view of the cutter head of FIG. 1, with the cutter inserts adjusted to a position between the wide-open position and the closed position;

FIG. 8 is sectional view taken in the plane indicated by line 8—8 in FIG. 3;

FIG. 9 is a view from the same direction as FIG. 8, showing operation of a cutter release mechanism;

FIG. 10 is an enlarged detail plan view of the tips of the cutter inserts of FIG. 5; and FIG. 11 is a detail elevation view of a tip of one of the cutter inserts of FIG. 10.

DETAILED DESCRIPTION OF THE PREFERRED EMBODIMENTS

Figure 1:
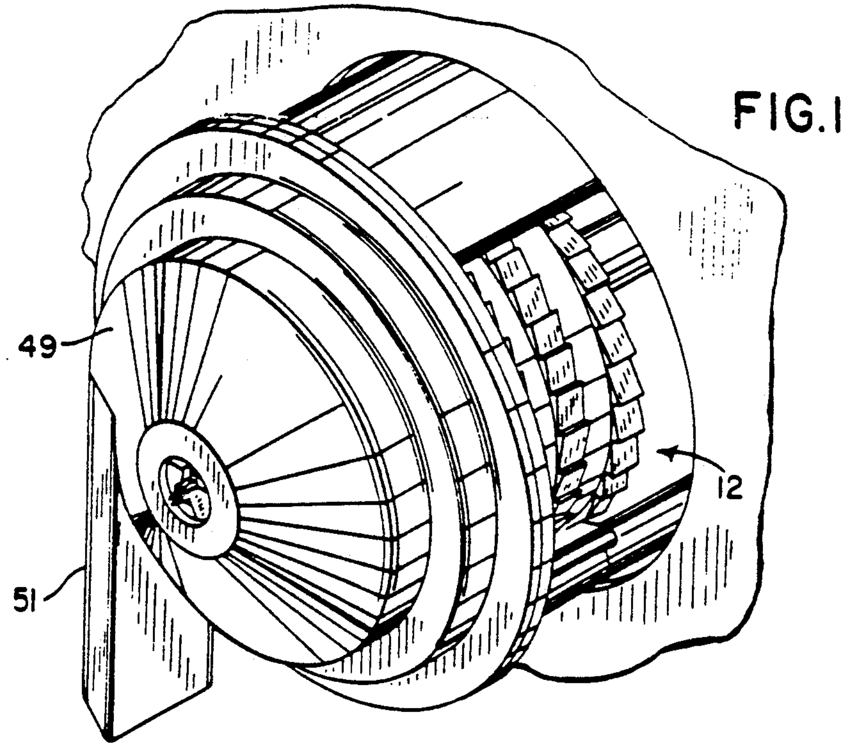
FIG. 1 is a perspective view of a cutter head which utilizes the cutter inserts of the present invention.

The invention is embodied in a pair of cutter inserts 10, 11 which are illustrated in FIG. 1 in a cutter head assembly 12 of a sign engraving machine. For further description of the cutter head assembly 12 and the sign engraving machine, reference is made to a copending U.S. patent application of Jambor, entitled "Method and Apparatus for Adjusting Line Width in a Sign Engraving Machine" and filed on even date herewith.

For purposes of the present description, it is sufficient to understand that the cutter head assembly 12 is rotated at a specified RPM (revolutions per minute) by a spindle motor, as the cutter head assembly 12 is moved transversely by an x-axis motor and drive mechanism. This results in a cutting action in which the overlapping circular cuts define the width of a line which is engraved in a sign blank.

Figure 3:
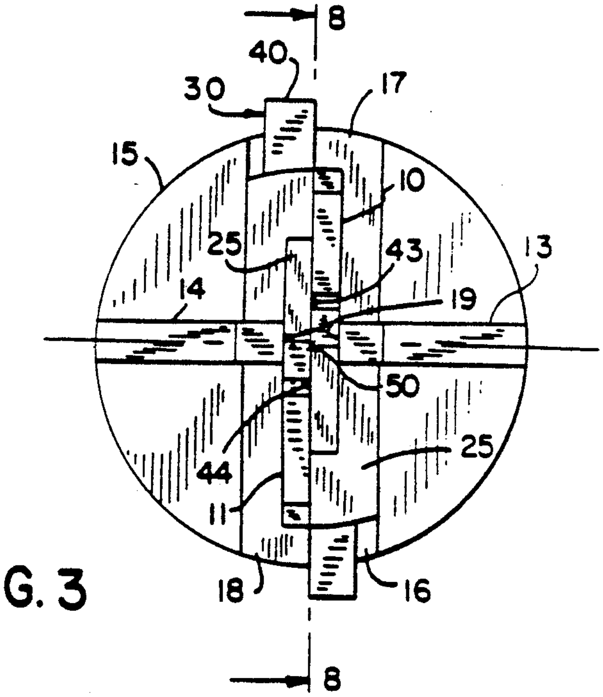
FIG. 3 is a front end view of the cutter head of FIG. 1, with the cutter inserts adjusted to the wide-open position.

The cutter inserts 10, 11 are disposed to move in face-to-face relationship along adjacent paths as seen in FIG. 3 The cutter inserts 10, 11 are positioned to extend from a central axis of rotation 50 of the cutter head assembly at 0° and 180°, respectively, relative to the central axis 50. A pair of fixed cutter wings 13, 14 extend, as seen in FIG. 3, along lines disposed at 90° and 270°, respectively, in a clockwise direction relative to the central axis 50. The cutter wings 13, 14 are integrally formed with a chuck head 15. The chuck head 15 has a central channel 16 aligned longitudinally along the 0°–180° axis. A pair of cutter insert holders 17, 18 are disposed in the central channel 16 for movement along two respective paths and in sliding face-to-face relationship along the 0°–180° axis.

The cutter wings 13, 14 have a gap 19 between them. This gap 19 is sized at twice the thickness of one of the cutter inserts 10, 11, so that the cutter inserts 10, 11 are laterally supported against spreading apart. The cutter wing support allows for less stringent specifications for the holders 17, 18.

Figure 2:
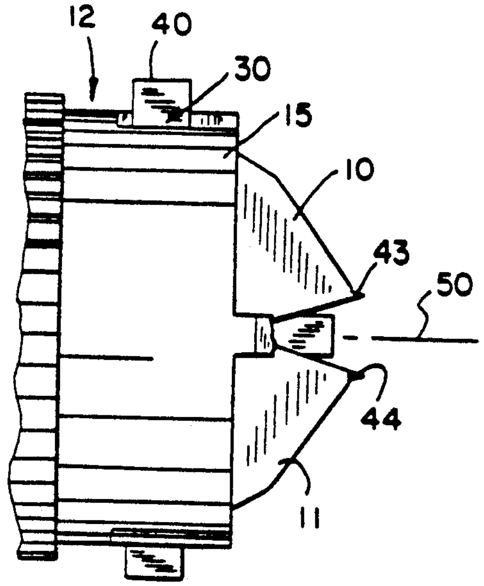
FIG. 2 is a left side view of the cutter head of FIG. 1, with the cutter inserts adjusted to a wide-open position.

FIGS. 2–7 show the cutter inserts 10, 11 in three respective positions. FIGS. 2–3 show the cutter inserts 10, 11 in their wide-open position with the holders 17, 18 spread their maximum distance in opposite directions along the 0°–180° axis. FIGS. 4–5 show the cutter inserts 10, 11 in their closed position with the holders 17, 18 closed to their minimum distance in opposite directions along the 0°–180° axis. FIGS. 6–7 show the cutter inserts 10, 11 in an intermediate position between the wide-open position and the closed position. In the preferred embodiment, the tips 43, 44 of the cutters can be moved to one of 15 incremental positions between the closed and wide-open position, the positions being spaced 0.015 inches apart.

The shape of one of the cutter inserts 10 is seen in FIGS. 8–9, the other cutter insert 11 being identical in shape to the illustrated insert 10. Each cutter insert 10, has a body of quadrilateral shape, including inner face 20, a top edge 21 and a bottom edge 22 (both inverted in FIGS. 8–9), an inside edge 23 and an outside edge 24. Each cutter insert 10, 11 also has a thickness dimension between inner face 20 and an outer face, which provides edges 21–24 with a thickness as seen in FIGS. 3, 5, 7 and 10.

Referring to FIGS. 8–9, the cutter inserts 10, 11 are secured in their respective holders 17, 18 by a cam 25 which is illustrated as it holds the insert 10 against an inner retaining wall surface 26 of the holder body 27. The cam 25 is pivoted on a central axle 28. The cam 25 is received in a slot 29 in plunger 30 of rectangular cross section. A stop 31 formed by a narrowing of the plunger 30 bears against a reaction spring 32 held in spring cage 33 in the holder body 27. The cam 25 has a slot 34 which receives a pin 35 projecting laterally from plunger 30. When the plunger 30 is moved longitudinally, the pin 35 moves in slot 34 engaging the peripheral surfaces formed by slot 34 to translate the linear movement of the plunger 30 to rotational movement of the cam 25. The cam 25 includes a rounded notch 37 with an apex extending outwardly from the holder 17 to form a camming surface 38 that bears on the inside edge 23 of the cutter insert 10.

To operate a cutter insert release mechanism, a tip 40 of the plunger 30 is pressed inward to compress spring 32 while rotating cam 25 clockwise as seen in FIG. 9. This releases the inside edge 23 of the insert 10, and allows it to move sideways and clear the retaining wall surface 26.

To install the cutter insert 10, the tip 40 of plunger 30 is pressed inward to compress spring 32 while rotating cam 25 clockwise as seen in FIG. 9. The cutter insert 10 is inserted into position with its top edge 21 (shown inverted) resting on surface 41 and with an apex 42 formed by its top edge 21 and outside edge 24 engaging retaining wall surface 26. The plunger 30 is then released, allowing cam 25 to rotate counterclockwise, as seen in FIGS. 8–9, to bring camming surface 38 into engagement with inside edge 23. This results in the cutter inserts 10, 11 being held on three sides 24, 21 and 23 and controls the depth of insertion into holders 17, 18 without calibration. During rotation of the cutter head 12, the holders 17, 18 are spun around the central axis of rotation 50, such that the plungers 30 are flung outward by centrifugal action which tends to increase the forces with which the cams 25 hold the cutter inserts 10, 11 in place.

Each of the cutter inserts 10, 11 has a cutting tip 43, 44, with tip 43 being shown in enlarged form in FIG. 11. Each tip 43, 44 is formed on flatted portion 52 of bottom edge 22 by approximately one-quarter of a conical section around a longitudinal axis 46 and extending from portion 52. The tip is actually 85° of the one-quarter conical section, the tip having a 5-degree relief 53 from parallel to a transverse axis 45 which is formed where the inside edges 23 meet the flats 52.

Referring to FIG. 11, there is a triangular cutout or relief 47 extending from the bottom edge of the body and between a longitudinal cutter tip axis 46 and the side edge 23 of the body. The cutout 47 includes a hypotenuse running along the side edge 23, one side running parallel along the cutter tip axis 46 and a short side running along the flatted portion 52 of the bottom edge 22. The distance between axis 45 and cutter tips 43, 44 has been exaggerated in FIG. 10 for a better view of this short side of relief 47. This relief 47 prevents chips from becoming wedged between the cutter inserts 10, 11. There is also a 10-degree relief 48 on the extreme end of the tip 43 to prevent drag on the sign material being cut.

The inside edges 23 of the cutter inserts 10, 11 running between the top edge 21 and the bottom edge 22 are disposed at an angle of approximately 15° from the cutter axis 46. The terms "about 15°" and "approximately 15°" shall mean 15 degrees with a tolerance of plus and minus 5 degrees.

When the cutter tips 43, 44 are positioned in the chuck head 15, the 15-degree inside edges 23 cross each other in an "X" pattern. This provides a path for chips from engraving operations to migrate from the cutter tips 43, 44 up the bodies of the inserts 10, 11, where they are spun around and flung into a circular exhaust system, which includes a plastic cup-shaped member 49 and chute 51. For further description of the exhaust system, reference is made to a copending U.S. patent application of Jambor, entitled "Automatic Chip Removal System for a Sign Engraving Machine" and filed on even date herewith. It has been discovered that this 15-degree angle helps prevent chips from becoming wedged and stuck between the cutter inserts when the cutters are being adjusted to the closed position. When the holders 17, 18 are moved to adjust the spacing of cutter tips 43, 44, the inserts 10, 11 provide a scissors action to dislodge any chips in the area of the tips 43, 44. The triangular cutout or relief 47 of the cutting tips also helps prevent chips from becoming wedged or stuck between the cutter inserts 10, 11 during engraving.

The side edges 24 opposite the inside edges 23 run at an angle of 20 degrees on an opposite side of axis 46. Bottom edge 22 runs at an angle of 27° from horizontal, in the orientation seen in FIGS. 8, 9 and 11.

The cutter inserts 10, 11 are preferably fabricated from C-2 sintered carbide material. The inserts 10, 11 are formed within a certain tolerance of their specified shape, because once formed, they are very hard, and machining and finishing operations should be kept to a minimum and are usually limited to finishing the tips 43, 44. Alternatively, the inserts 10, 11 can also be formed of tool steel or micrograin carbide material.

The inserts 10, 11 may optionally be coated with a titanium nitride coating to reduce stickiness and increase wear life.

This description has been by way of example of how the invention can be carried out. Those of ordinary skill in the art will recognize that various details may be modified in arriving at other detailed embodiments, and that many of these embodiments will come within the scope of the invention. Therefore to apprise the public of the scope of the invention and the embodiments covered by the invention the following claims are made.

We claim:

1. One of a pair of cutter inserts for use in a sign engraving machine, the cutter insert comprising:

a body with a top edge and a bottom edge;

a cutter tip projecting longitudinally from the bottom edge of the body and substantially parallel to a longitudinal axis of the cutting tip;

wherein the cutter tip is formed as approximately one-quarter of a conical section around its longitudinal axis;

wherein the body of the cutter insert has a side edge running from the top edge towards the bottom edge at an angle of approximately 15° relative to the longitudinal axis of the cutter tip; and wherein the cutter tip is formed with an inverted right angle cutout portion from the side edge of the body.

2. The cutter insert of claim 1, wherein the body forms a second side edge on a side opposite the first-mentioned side edge, the second side edge running at an angle of about 20° on an opposite side of the longitudinal axis from the first-mentioned side.

3. The cutter insert of claim 1, wherein the top edge of the cutter body runs substantially perpendicular relative to the longitudinal axis of the cutter tip.

4. The cutter insert of claim 1, wherein the cutter is made of a sintered carbide material.

* * * * *